Sept. 26, 1939.　　　F. W. SULLINGER　　　2,174,016
DIRECTION FINDER
Filed April 8, 1937　　　2 Sheets-Sheet 2
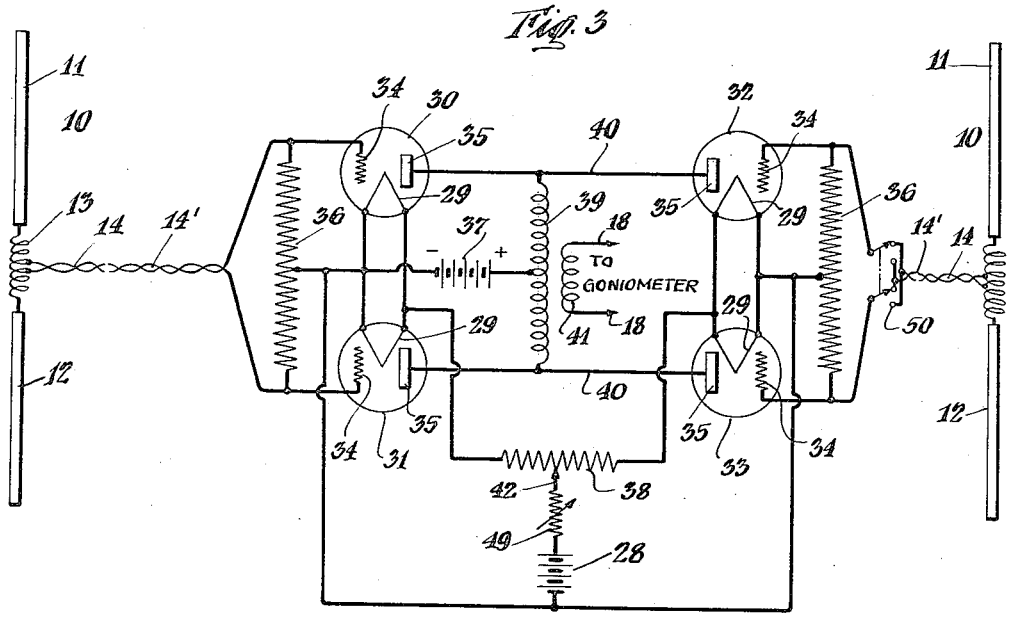
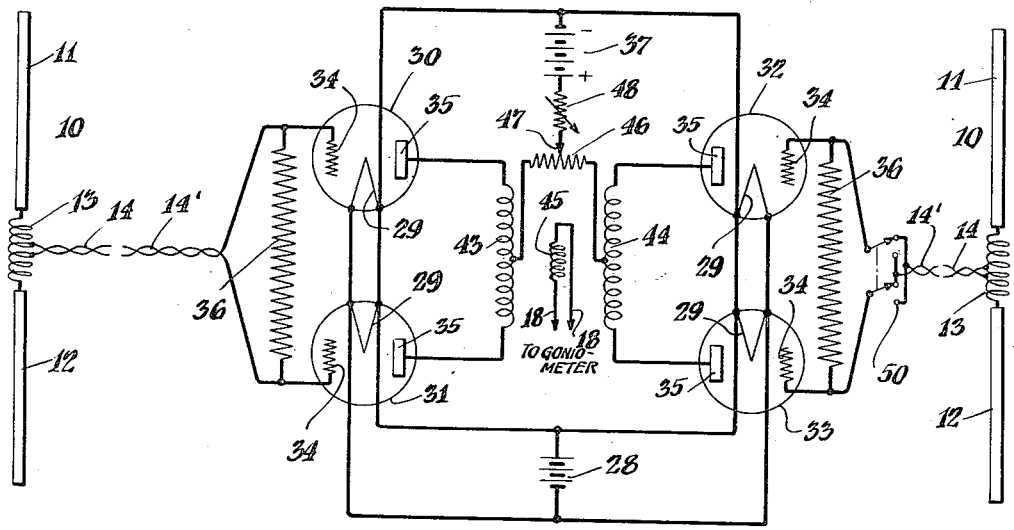
INVENTOR
*Ferris W. Sullinger*
BY
*Hoguet, Neary & Campbell*
his ATTORNEYS Patented Sept. 26, 1939

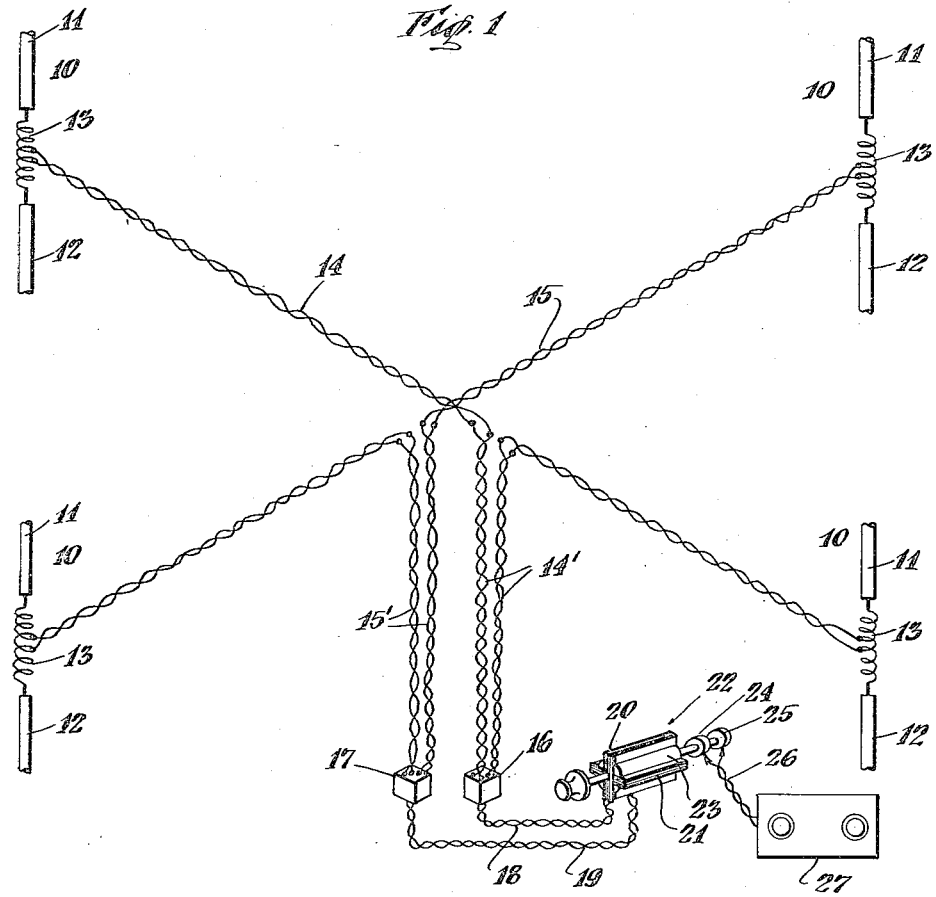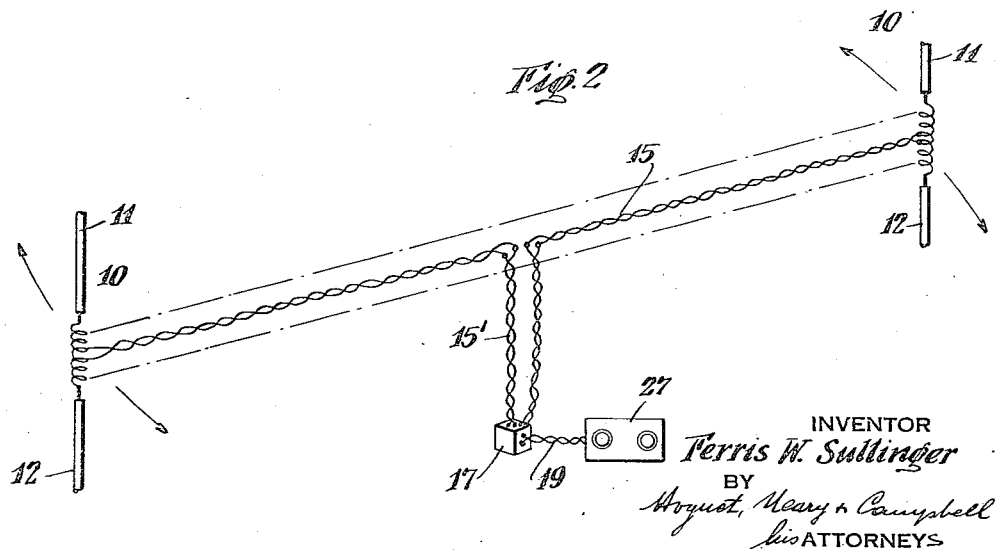

2,174,016

UNITED STATES PATENT OFFICE 2,174,016

DIRECTION FINDER

Ferris W. Sullinger, Coral Gables, Fla., assignor to Pan American Airways Corporation, Jersey City, N. J., a corporation of Delaware Application April 8, 1937, Serial No. 135,652

10 Claims. (Cl. 250—11)

My invention relates to radio direction finders and more particularly to a vacuum tube arrangement for electrically balancing such devices to produce sharp and accurate indications of the direction of arrival of received waves and thereby the direction of the station from which they were transmitted.

In my copending joint application Serial Number 124,108, filed February 14, 1937, there is disclosed a radio direction finder of the Adcock type, which is electrically balanced by means of variable condensers connected to the dipole antenna rods. Proper adjustment of these variable condensers electrically balances the capacities of opposite dipoles so that they furnish the same signal voltage to the midpoint of the system and produce sharp signal minima in the receiver. This provides accurate indications of the direction of arrival of the received waves and thereby the true direction of the transmitting station, which may be on the ground or aboard aircraft.

In accordance with my present invention I effect the desired electrical balance in the radio direction finder and consequently obtain accurate indications of the direction of arrival of the received waves, by equalizing any unequal signal voltages supplied by opposite antennae. For this purpose I use vacuum tubes that electrically connect opposite dipole antennae with the direction indicating instrument, i. e., a radio goniometer. The vacuum tubes are so arranged that by adjustment of their operating voltages any electrical dissymmetry or unbalance between opposite dipoles will be compensated for. Consequently, the vacuum tubes effectively supply to the radio goniometer coils the same E. M. F. from opposite dipoles, and since the voltages from opposite dipoles are in phase opposition sharply defined minima or null points are obtained in the goniometer and are heard in the radio receiver which is electrically connected to the goniometer. One of the characteristic features of my invention is the sharp minima produced in the radio receiver whereby the direction of the signal source is sharply and accurately indicated.

An object of my invention is to produce a radio direction finder that is in effect electrically symmetrical and accurately indicates at all times the exact direction of arrival of received waves.

The novel features of the invention are set forth with particularity in the appended claims. The invention itself, however, both as to organization and method of operation will be clearly understood from the following description taken in conjunction with the accompanying drawings, in which:

Figure 1 is an illustrative embodiment of my raido direction finder of the elevated spaced-fixed type;

Figure 2 is an illustrative embodiment of my radio direction finder of the elevated rotatory type;

Figure 3 illustrates diagrammatically one arrangement of the vacuum tube coupling between two opposite dipole antennae and the goniometer for equalizing the signal voltages supplied by these antennae; and Figure 4 illustrates diagrammatically a modification of the system shown in Figure 3.

Referring now to the drawings and in the first instance to Figure 1, it will be noted that the radio direction finder in this embodiment comprises four vertical elevated dipoles 10 spaced 90° apart; each dipole having an upper arm 11 and a lower arm 12 connected in series with a matching transformer 13. Opposite dipoles are electrically connected in phase opposition by means of the transposed transmission lines 14 and 15. At the electrical center points of the lines 14 and 15 are connected lead in lines 14' and 15' which terminate in two vacuum tube coupling devices shown diagrammatically at 16 and 17. These devices are illustrated in detail in Figures 3 and 4. Lead in lines 14' and 15' may, if desired, be continuations of lines 14 and 15 respectively. Lead lines 18 and 19 connect the vacuum tube coupling devices 16 and 17 respectively with the two stator coils 20 and 21 of the radio goniometer 22. This goniometer is of conventional type and has a search coil 23 which is rotatable in the stator coils 20 and 21 and is connected through slip rings 24 and 25 and lead lines 26 to a conventional type radio receiver 27.

In the rotatory type of direction finder shown in Figure 2, a radio goniometer is not needed so that the vacuum tube coupling device 17 is connected directly to the radio receiver 27.

It is to be understood that the vacuum tube coupling devices 16 and 17 may be located either at ground level adjacent the station goniometer, when used, and the radio receiver 27, or may be located in an elevated position adjacent the midpoints of the transmission lines 14 and 15. This applies to both the spaced-fixed and rotatory types of direction finders. When the vacuum tube devices are located in the elevated position they may be supported by the poles commonly used near the center of the transmission lines for supporting the latter, and the adjustment of the A and B battery voltages explained below may be effected by means of a light weight insulator rod, such as a bamboo pole, having one end slotted to engage the sliding arm on the A and B battery potentiometers and variable resistors.

In order to produce sharp minima in the receiver 27 and thereby give accurate bearings upon the transmitting station, the respective electromotive forces delivered by opposite dipole antennae assemblies to the vacuum tube coupling device 16 are effectively equalized, that is, they are so controlled that they produce equal voltage outputs from the device 16. The same is true of the electromotive forces supplied by the dipole assemblies connected to the coupling device 17. These electromotive forces are affected by a number of conditions, as for example, the over-all length of the antenna, the total inductance of the matching transformer coil or other means used for connecting the upper and lower arms of the dipoles, the inductance of that portion of the connecting coil across which the transmission line is tapped, the attenuation of the transmission line and the capacity across the connecting coil. If, for example, opposite dipoles have different capacities to ground, they will not supply the same E. M. F. to the midpoint of the direction finder and unless the unequal E. M. F.'s are compensated for, sharp minima will not be produced in the receiver.

The unequal voltages supplied by opposite antennae to the mid-point of the system may be compensated for and the electrical symmetry of the direction finder may be established by certain adjustments of the vacuum tubes shown in Figures 3 and 4, so that the output voltages of the vacuum tubes connected to one dipole will be the same as that of the tubes connected to the opposite dipole. Referring first to Figure 3, the unequal voltages from opposite dipoles 10 may be equalized by adjustment of the voltage supplied by the A battery 28 to the filaments 29 of the four vacuum tubes 30, 31, 32 and 33. Each of these vacuum tubes has, in addition to the filament 29, a grid 34 and a plate 35. The tubes 30 and 31 are conected in a balanced or push-pull arrangement. The same is true of the tubes 32 and 33. For sake of simplicity, only two dipole assemblies and one vacuum tube coupling device are shown in Figure 3, but it will be understood that in a four dipole elevated spaced-fixed type of direction finder this same arrangement would be repeated for the other two spaced dipole assemblies.

As shown in Figure 3, the transposed transmission line 14 or its extension 14' terminates in a center-tapped resistance 36, rather than in a reactance. The value of this resistance 36 is chosen to equal the characteristic or surge impedance of the transmission line 14 so that there will result no standing waves along the line. These resistances 36 are connected to the filaments 29 and grids 34 of the four vacuum tubes as shown.

The plate voltage for the four vacuum tubes is supplied by a B battery 37. The filament voltage, which is supplied by the A battery 28, is regulated by a potentiometer 38. The output of the four vacuum tubes is conducted to a coil 39 which is connected in parallel with the plate lead lines 40. Coil 39 is inductively coupled to a coil 41 which is in turn connected to a goniometer, shown in Figure 1, by means of lead lines 18. If desired, coil 41 may be eliminated, in which case coil 39 would be one stator winding of the goniometer. In the case of a two-dipole rotatory type of assembly, as shown in Figure 2, the coil 41 would be connected directly to the input of the radio receiver 27.

In order to balance the direction finder so that the electromotive force from opposite dipoles 10 in Figure 3 will produce the same E. M. F. across inductance 39 and thereby produce sharp minima in the receiver, the potentiometer 38 is adjusted by moving the slider 42 in a well known manner. It will be seen from the circuit connections shown in Figure 3 and explained above that when the slider 42 of the potentiometer 38 is moved in one direction the voltage supplied by the A battery 28 to the filaments 29 of tubes 30 and 31 will be different in amount from that supplied to the filaments 29 of the tubes 32 and 33. For example, if the potentiometer 38 is adjusted by movement of the slider 42 in a direction to reduce the amount of voltage supplied to the tubes 30 and 31, it will simultaneously cause a greater amount of voltage to be supplied to the filaments 29 of the tubes 32 and 33. Movement of the slider 42 in the opposite direction would increase the filament voltage supplied to the tubes 30 and 31 and decrease the filament voltage supplied to the tubes 32 and 33. To effect the desired balance the tubes connected to the dipole that is supplying the greater signal voltage to the midpoint of the transmission line should have their filament voltage decreased and those connected to the dipole supplying the smaller signal voltage should have their filament voltage increased. In this manner the system may be adjusted so that the electromotive force from opposite dipoles will produce the same E. M. F. across inductance 39 and thereby produce sharp minima in the receiver.

The procedure for determining the point at which opposite dipoles deliver the same E. M. F. to the midpoint of the system and thereby produce sharp minima may be as follows: The complete system being installed in an operative position, a local radio frequency oscillator is placed on the ground in line with the north and south dipoles and a short distance beyond either. The goniometer search coil is then turned to give minimum signal output from the receiver 27, which is tuned to the oscillator frequency. The slide wire 42 on the potentiometer 38 is then moved until a setting is found which gives the sharpest minimum or null point in the receiver 27, shown in Figure 1 as the goniometer is manipulated. When this point has been found the output electromotive force of the tubes 30 and 31 is the same as that of the tubes 32 and 33; these electromotive forces being equal and in phase opposition will balance out so that the effective signal voltage in the receiver 27 will be approximately zero. When this condition has been established, the east and west dipole assemblies will then be balanced.

To balance the north and south dipoles, the local oscillator is positioned in line with the east and west dipoles and a short distance beyond either. The same procedure described just above is then carried out for balancing the north and south dipoles.

When the vacuum tube coupling device has been regulated to effectively equalize the signal voltages supplied by opposite dipoles, i. e. to give equal outputs for the different signal voltages received from the east and west dipoles respectively and likewise equal outputs for the different signal voltages received from the north and south dipoles respectively, to give sharp minima as explained further above, it is desirable further to properly adjust the overall amplified output produced by the east-west dipole assembly with respect to the overall amplified output produced by the north-south dipole assembly, to give a definite relationship between the two that can be duplicated when changes are made in the system such as the replacement of vacuum tubes. This adjustment is made by varying the resistor 49, shown in Fig. 3, in each vacuum tube coupling device between opposite dipoles. The variable resistor 49 may be adjusted in either one or both of the amplifiers connecting the east-west and north-south dipole assemblies until their respective overall outputs are the same. This adjustment is important because the ratio of these two output voltages directly affects the calibration curve of the system, as indicated by the following description.

Assume first that each pair of antennae are balanced as outlined above. Now it can be seen that the calibration curve will change if the overall sensitivity of one pair of opposite antennae and associated vacuum tube coupling device does not maintain a constant ratio with respect to the overall sensitivity of the other pair of antenna and associated vacuum tube coupling device. The meaning of the term "overall sensitivity" as herein used in reference to one pair of opposite dipoles and their associated vacuum tube coupling device may be explained as follows: Assume that opposite dipoles are acted upon by a wave of uniform field strength and uniform polarization. Further assume that the direction of travel of the wave is such that there is a uniform sensible time interval between the time it acts upon one dipole and the time it acts upon the opposite dipole; thus there would be a uniform time phase angle between the voltages induced in opposite dipoles by the assumed wave. Under these assumed conditions the "overall sensitivity" of one pair of opposite dipoles and their associated coupling unit would be expressed by the ratio A/B in which A is equal to the E. M. F. appearing across the associated goniometer stator winding, and B is equal to the E. M. F. induced in one dipole.

As a specific example, let us assume that a wave is arriving from a direction midway between two adjacent antennae. In this case if the entire system is symmetrical, and properly balanced, a minimum will be obtained at a 45 degree point on the goniometer dial, since under this condition the voltages applied to the two goniometer stator windings will be equal. Now assume that there is a change in the overall sensitivity of one pair of antennae; the minimum will no longer be obtained at the 45 degree point, but will be found some distance away, depending on the magnitude of the change in sensitivity experienced.

In order to insure a constancy of calibration, the following method has been devised to make possible a quick and accurate adjustment of the overall sensitivity. A low power oscillator is set up together with a vertical antenna at the center of the direction finder system. Due to the circular radiation pattern of this antenna, and its location at the center of the system, the field strength produced by it is equal at the locations of the four antennae of the direction finder system. In addition, the voltage induced in the four antennae will be in time phase. Now at the point where the north and east transmission lines connect to their respective balancing amplifiers, a double pole-double-throw switch 50 is interposed so that the sense of connection can be reversed. Thus for normal operation this connection would be made so that the amplified voltage from opposite antennae would be in phase opposition. Now if this connection is reversed, the amplified voltage from opposite antennae will be in phase addition. Opposite antennae being balanced, the adjustment to insure equal overall sensitivity of the two pairs of dipoles is effected as follows:

The oscillator, at the center of the system, is put in operation on the desired frequency.

The connections of two adjacent transmission lines, for example north and east, are reversed at the amplifier inputs so as to give phase addition as discussed above.

The goniometer rotor is turned to a point of minimum signal or null point. If this does not come at a 45 degree point on the dial, the overall gain of one of the amplifiers is adjusted until the null point is obtained at a 45 degree point. This is accomplished by varying resistor 49 as explained previously.

The connections of the two adjacent transmission lines, which were reversed, are now switched back for normal operation.

The above procedure gives a condition which can be readily duplicated and thus assures a constancy of calibration curve.

In the case of a rotatable system only one balancing amplifier is involved and, this effects only the sharpness of minima obtained. It has no effect on the calibration curve.

The system shown in Figure 4 is similar to that of Figure 3 except that the system is balanced, that is, the electromotive forces from opposite dipoles are equalized by adjustment of the B battery voltage instead of the A battery voltage. In the arrangement of Figure 4 the output circuit of the tubes 30 and 31 is connected to an inductance coil 43 and the output from the tubes 32 and 33 to an inductance coil 44. Between the center points of these two coils 43 and 44 is tapped a potentiometer 46 that is connected with the B battery 37 through a variable resistance 48. In order to equalize the outputs of the tubes 30—31 and 32—33, the slide wire 47 of the potentiometer 46 is adjusted in a manner similar to that described above in connection with the balancing of the dipole assemblies in Figure 3, until a sharp minimum is produced in the receiver 27, shown in Figure 1. The effective output of the coils 43 and 44 is conducted to the goniometer 22, shown in Figure 1, by means of a coil 45, which is electromagnetically coupled equally to the coils 43 and 44, and connected with the goniometer 22 by means of lead wires 18. If desired, coil 45 may be eliminated in which case coils 43 and 44 would be respectively one-half of one stator winding of the goniometer.

The overall sensitivity of the east-west and north-south dipole assemblies shown in Figure 4 may be equalized by adjustment of the variable resistance 48 in the same manner described above in connection with adjustment of the variable resistance 49 of Figure 3.

It thus becomes apparent from the foregoing description of the arrangements in Figures 3 and 4 that the direction finder may be balanced by regulation of the A battery voltage, as illustrated in Figure 3, or by regulation of the B battery voltage illustrated in Figure 4. If desired, both types of regulation may be used.

It is desirable to use a common heater or filament supply and a common plate and grid voltage supply for both vacuum tube coupling devices in the case of a spaced-fixed direction finder system to minimize any change in the calibration curve caused by a varying supply voltage.

Instead of, or in addition to, the adjustments of the A and B battery voltages as described above, the systems may be balanced to produce sharp minima by proper adjustment of the D. C. voltage applied to any element of the vacuum tubes. For sake of simplicity triode types of tubes are shown in the drawing but, as above suggested, multiple grid types of tubes such as screen grid tubes and pentodes may be used. When multiple grid tubes are used, the control may be effected by varying the positive or negative bias of any of the grids; for example, by varying the positive D. C. voltage applied to the screen grid. If desired, heater types of tubes may be used and the heaters may be operated from an A. C. source.

It is to be understood that my invention is not limited to the illustrative embodiments illustrated and described herein, but that various modifications may be made in the balancing arrangements without departing from the scope of my invention. The appended claims are directed to some of the novel features of this invention.

I claim:

1. In a radio direction finder, the combination of a pair of spaced vertical antennae, an amplifier electrically connected to each antenna and means for varying the gain of each amplifier to compensate for unequal signal voltages supplied to said amplifiers by said antennae and to equalize the signal voltages delivered by said amplifiers to render the antennae, effectively, electrically symmetrical.

2. A radio direction finder system comprising a plurality of vertical antennae, arranged in pairs with the antennae of each pair equidistant from a common center, vacuum tube amplifiers having an input circuit and an output circuit, transposed transmission lines connecting each antenna to the input circuit of an amplifier, and means for varying the gains of said amplifiers to compensate for unequal signal voltage outputs from each antenna of a pair and to equalize the voltages in the output circuit of the amplifiers associated with each antenna of a pair.

3. A radio direction finder system comprising a pair of spaced antennae, a pair of transposed transmission lines having inner and outer ends connected at their outer ends to different antennae, a plurality of vacuum tubes electrically connected to the transmission lines at their inner ends and at the center of the system, a source of power for operating said tubes, and means for varying the amount of power supplied to tubes connected to each antenna to compensate for unequal signal voltages supplied by said antennae and to effectively produce at the center point of the direction finder the same electromotive force output from each antenna.

4. A radio direction finder comprising a pair of opposed, spaced antennae, a radio receiver for interpreting the signals received by said antennae, a vacuum tube amplifier electrically connected to each antenna and electrically coupling said receiver with each antenna at the center of the system, means for supplying filament voltage to the vacuum tube amplifier, and means for varying the filament voltage supplied to each amplifier for compensating for unequal signal voltages supplied to said amplifiers by said antennae and for equalizing the signal voltages supplied by said amplifiers to said receiver.

5. A radio direction finder system comprising a pair of spaced antennae, transmission lines connected to said antenae and having inner ends, a radio receiver for interpreting the signals received by said antennae, a pair of vacuum tube amplifiers electrically coupling said receiver with the inner ends of said transmission lines, means for supplying plate and grid voltages to the vacuum tube amplifiers, and means for varying the plate and grid voltages supplied to the vacuum tube amplifiers coupled to each antenna for compensating for unequal signal voltages supplied to said amplifiers by said spaced antennae and to equalize the signal voltages supplied by said amplifiers to said receiver.

6. A radio direction finder system comprising two pairs of vertical spaced antennae arranged on lines at an angle to each other so as to intersect at a common center, transmission lines connected to said antennae and having inner ends, a radio goniometer, a radio receiver electrically connected to said goniometer, vacuum tube amplifiers electrically connecting the inner ends of said transmission lines at said common center with said goniometer, and means for varying the gain of said amplifiers to compensate for unequal signal voltages supplied by the antennae of each pair and to equalize the voltages supplied to said goniometer by the amplifiers connected to each pair of antennae.

7. A radio direction finder system comprising a pair of elevated spaced vertical dipoles, transposed transmission lines having inner and outer ends and each having an outer end connected to one of said dipoles, a plurality of vacuum tubes connected to the inner ends of said transmission lines, means for supplying operating voltages to said vacuum tubes, and means for varying the operating voltages for said vacuum tubes to compensate for unequal signal voltages supplied by each of said dipoles to the inner ends of said transmission lines, and to equalize the overall output of said dipoles and associated vacuum tubes.

8. A radio direction finder system comprising a pair of spaced vertical antennae, transmission lines having inner and outer ends and connected at their outer ends to different antennae, a resistance connected to the inner end of each transmission line, a plurality of vacuum tubes connected to each of said resistances, means for supplying operating voltages to said vacuum tubes, and means for varying the operating voltage applied to said vacuum tubes for compensating for unequal voltages delivered by said antennae to said vacuum tubes and to equalize the signal voltage supplied by said vacuum tubes to cause said antennae to supply the same signal voltages to the midpoint of the direction finder.

9. A radio direction finder system comprising a plurality of spaced elevated antennae arranged in pairs with each antenna equidistant from a common center, transposed transmission lines connected to said antennae and terminating at said common center in pure resistances, a plurality of vacuum tubes connected to said resistances and having their output connected to an inductance coil, a source of power for furnishing filament voltage to said tubes, and means for varying said filament voltage to compensate for unequal signal voltages supplied by the antennae of a pair and to establish equal outputs from the vacuum tubes connected to said pair of antennae.

10. A radio direction finder comprising a pair of spaced elevated vertical dipoles, each dipole having an upper and a lower portion, a matching transformer connecting said upper and lower portions, transposed transmission lines having inner and outer ends, said outer ends being connected to said matching transformers, a pure resistance electrically connected at the inner end of each of said transmission lines, two pairs of vacuum tubes, each pair of tubes being connected in push-pull arrangement and having their input circuits connected to one of said resistances, means for supplying operating voltage to each pair of said vacuum tubes connected in push-pull arrangement, and means for varying said operating voltage to compensate for unequal signal voltages supplied by said antennae and to effect the same output from each of said pairs of vacuum tubes, whereby said antennae effectively furnish the same electromotive force to the electrical midpoint of the direction finder and produce sharp minima.

FERRIS W. SULLINGER.